No. 854,615. PATENTED MAY 21, 1907.
A. J. VORHEIS & J. C. MOYER.
WATERING DEVICE.
APPLICATION FILED JULY 27, 1905.
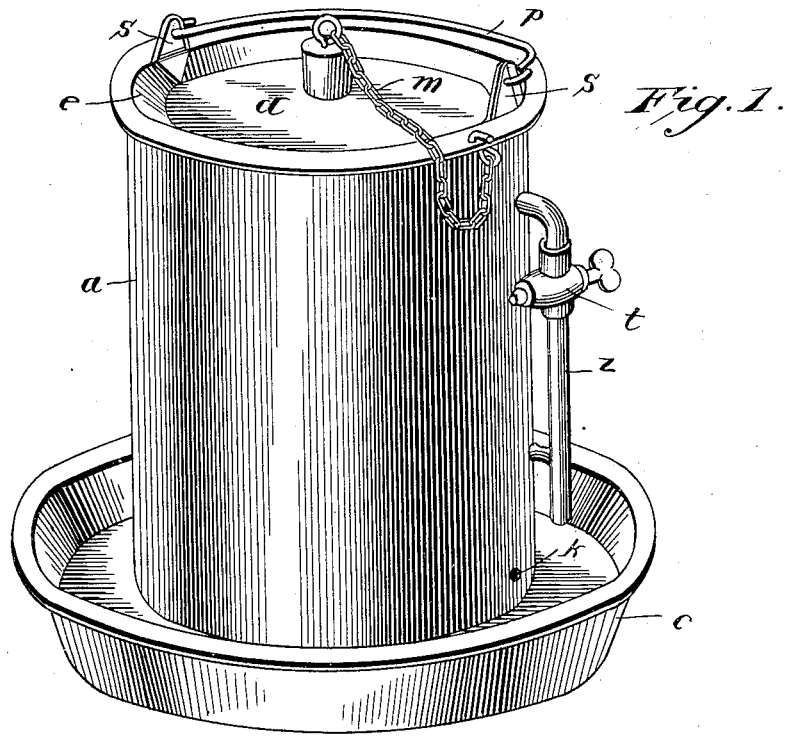
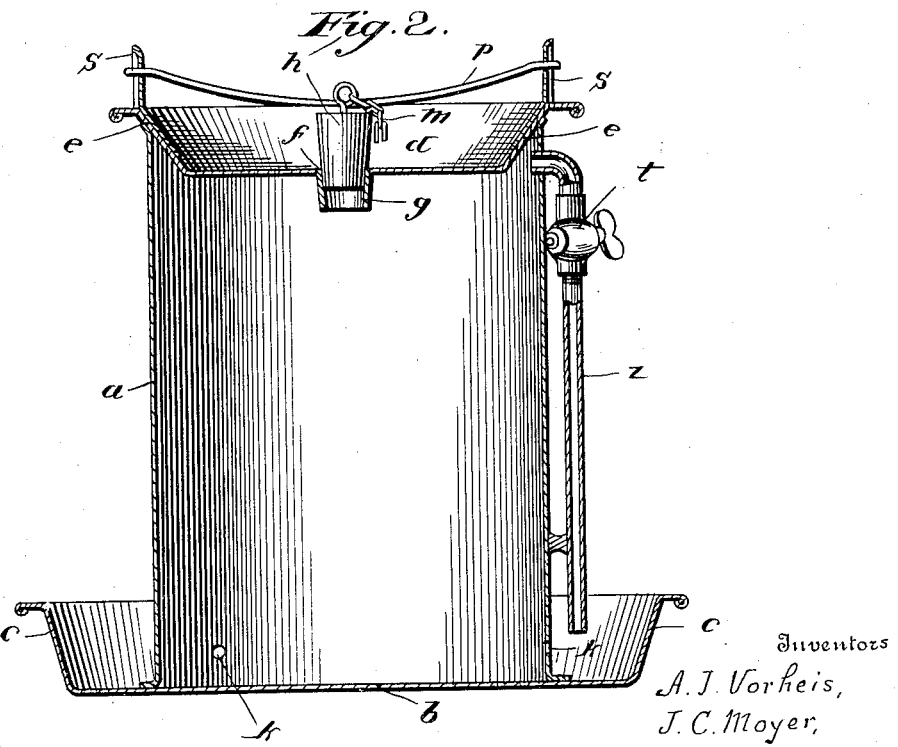
Witnesses
W. S. S. Rockwell
George M. Anderson.
Inventors
A. J. Vorheis,
J. C. Moyer,
By E. W. Anderson
Attorney

UNITED STATES PATENT OFFICE.

ADDISON J. VORHEIS AND JAMES C. MOYER, OF BURLINGTON, IOWA.

WATERING DEVICE.

No. 854,615.  Specification of Letters Patent.  Patented May 21, 1907.

Application filed July 27, 1905. Serial No. 271,454.

*To all whom it may concern:*

Be it known that we, ADDISON J. VORHEIS and JAMES C. MOYER, citizens of the United States, and residents of Burlington, in the county of Des Moines and State of Iowa, have made a certain new and useful Invention in Watering Devices; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the watering tank. Fig. 2 is a central longitudinal vertical section of the same.

The invention relates to watering devices designed chiefly for watering poultry, and it consists in the novel construction and combination of parts as hereinafter set forth.

In the accompanying drawings, illustrating the invention, the letter $a$, designates an upright reservoir tank having a closed bottom $b$, which extends outward around the tank, and is provided with a rim $c$, of sufficient height to form a trough extending around the lower portion of the tank. The height of the tank is much greater than the height of the rim of the trough portion, and it is designed to provide a supply chamber for the water.

The top $d$, of the tank, is secured thereto in an air-tight manner, and is dished or recessed, a sloping wall $e$, being provided around it, which rests upon the top of the tank. In the center of this top is an aperture $f$, having an elongated tapered seat $g$, for the stopper $h$, which being similarly formed is, provided with a long bearing to insure an air-tight closure.

Near the bottom of the tank, and just below the level of the top of the rim $c$, are made small outlet apertures $k$, through which the water from the supply chamber flows into the trough. An air inlet tube $z$, opening exteriorly just above the level of the outlets $k$, communicates with the upper part of the supply chamber. This inlet tube $k$, is provided with a stop valve $t$. The stopper is preferably made of rubber, and is connected to the tank by a chain $m$. The tank is usually provided with a bail $p$, connected to ears $s$, for convenience in handling.

The tank, having been filled with water, and tightly closed by means of the stopper, is designed to be placed in the poultry yard. The valve of the inlet tube being open water runs out through the apertures $k$ until the bottom trough is filled to the height of the lower end of the air pipe, and as the poultry take the water from the trough it is replaced in an automatic manner, as hereinbefore explained.

The trough is not designed to extend over two or three inches from the tank wall, which serves as an abutment or fender wall to prevent the poultry from getting into the trough and soiling the water therein. When it is designed to clean the trough the valve of the air inlet tube is closed, so that the water is held in the reservoir tank during the cleaning operation.

Having thus described our invention, what we claim and desire to secure by Letters Patent is:—

1. A watering tank consisting of a reservoir having the lower portion of its outer surface free of attachment devices and consequently entirely smooth and uninterrupted with relation thereto, a trough surrounding its bottom portion, and a plurality of water supply openings communicating with such trough and designed to be always open, an air tube opening at its lower end below the level of the top of the trough and communicating at its upper end with the top portion of the reservoir, and means for controlling the passage of water into such trough through the supply openings and for stopping such passage when required consisting of a valve in the air tube, substantially as specified.

2. A watering tank consisting of a reservoir having the lower portion of its outer surface free of attachment devices and consequently entirely smooth and uninterrupted with relation thereto, a trough surrounding its bottom portion, and a plurality of water supply openings communicating with such trough and designed to be always open, an air tube opening at its lower end below the level of the top of the trough and communicating at its upper end with the top portion of the reservoir, means for controlling the passage of water into the trough through the supply openings and for stopping such passage when required, consisting of a valve in said air tube, said reservoir having a dished top extending to and resting upon the top wall of the same, and having an elongated tapered stopper seat, and an elongated tapered rubber stopper, substantially as specified.

In testimony whereof we affix our signatures, in presence of two witnesses.

ADDISON J. VORHEIS.
JAMES C. MOYER.

Witnesses:
JOHN P. HASSEL,
S. J. BECKMAN.